(12) United States Patent
Deng et al.

(10) Patent No.: US 11,067,150 B2
(45) Date of Patent: Jul. 20, 2021

(54) TRANSMISSION SPEED REDUCTION DEVICE

(71) Applicant: CHENGDU ZHONGLIANGCHUANGONG TECHNOLOGY CO., LTD, Sichuan (CN)

(72) Inventors: Xingqiao Deng, Sichuan (CN); Pan Zhang, Sichuan (CN); Yuanyuan Jiang, Sichuan (CN); Zhipeng Feng, Sichuan (CN); Shuangcen Li, Sichuan (CN); Fanxing Kong, Sichuan (CN)

(73) Assignee: CHENGDU ZHONGLIANGCHUANGONG TECHNOLOGY CO., LTD, Sichuan (CN)

( * ) Notice: Subject to any disclaimer, the term of this patent is extended or adjusted under 35 U.S.C. 154(b) by 210 days.

(21) Appl. No.: 16/473,014

(22) PCT Filed: Apr. 27, 2017

(86) PCT No.: PCT/CN2017/082100
§ 371 (c)(1),
(2) Date: Jun. 24, 2019

(87) PCT Pub. No.: WO2018/120541
PCT Pub. Date: Jul. 5, 2018

(65) Prior Publication Data
US 2020/0088266 A1    Mar. 19, 2020

(30) Foreign Application Priority Data
Dec. 29, 2016   (CN) .......................... 201611247782.4

(51) Int. Cl.
*F16H 1/20*     (2006.01)
*F16H 55/10*    (2006.01)
(Continued)

(52) U.S. Cl.
CPC ............ *F16H 1/206* (2013.01); *F16H 55/10* (2013.01); *F16H 57/023* (2013.01);
(Continued)

(58) Field of Classification Search
CPC ........ F16H 1/206; F16H 55/10; F16H 57/023; F16H 57/039; F16H 2057/02073; F16H 13/08; F16H 13/04
See application file for complete search history.

(56) References Cited

U.S. PATENT DOCUMENTS 2,451,998 A * 10/1948 Wahlberg .............. F16H 57/039
74/458
RE26,476 E * 10/1968 Kuehnle ................... F16H 1/30
74/424.5
(Continued)

FOREIGN PATENT DOCUMENTS

CN    1291265 A  *  4/2001   ............. F16H 15/50
CN    1514915        7/2004
(Continued)

OTHER PUBLICATIONS

International Search Report dated Sep. 26, 2017 in International Application No. PCT/CN2017/082100.

*Primary Examiner* — Thomas C Diaz
(74) *Attorney, Agent, or Firm* — Michael X. Ye; Morris, Manning & Martin, LLP

(57) ABSTRACT

A transmission speed reduction device, comprising: a worm assembly (1) which is located within a container body (2), a worm wheel assembly (3) and an output axle (4); an input axle (11) is provided on the worm assembly (1), while the worm assembly (1) and the worm wheel assembly (3) achieve primary stage mesh transmission there between by means of worm teeth which are provided on the worm assembly (1) and a first worm wheel tooth (34) which is provided on the worm wheel assembly (3); the worm wheel
(Continued)

assembly (3) and the output axle (4) achieve secondary stage mesh transmission by means of an intermediate rotary body (32) which is provided on the worm wheel assembly (3) and a rotary disc assembly (5) which is fixed on the output axle (4). The transmission speed reduction device has a compact structure, a large transmission ratio, is high precision, has low friction wear, and is easily applicable in the development of industrial production and manufacturing, while being low cost and being suitable for precision heavy load transmission scenarios having large transmission ratio requirements and volume restrictions, such as joints of industrial robots and the like.

9 Claims, 11 Drawing Sheets

(51) Int. Cl.
F16H 57/023 (2012.01)
F16H 57/039 (2012.01)
F16H 57/02 (2012.01)

(52) U.S. Cl.
CPC . *F16H 57/039* (2013.01); *F16H 2057/02073* (2013.01); *F16H 2057/02086* (2013.01)

(56) References Cited

U.S. PATENT DOCUMENTS 4,297,919 A  11/1981  Kuehnle
5,112,284 A   5/1992  Dye

FOREIGN PATENT DOCUMENTS

| CN | 103615499 | 3/2014 |
| CN | 204805439 | 11/2015 |
| CN | 204904273 | 12/2015 |
| CN | 106499774 | 3/2017 |
| CN | 106499775 | 3/2017 |
| CN | 208419433 | 8/2017 |
| CN | 208419434 | 8/2017 |
| GB | 1290249 | 9/1972 |

* cited by examiner

TRANSMISSION SPEED REDUCTION DEVICE

FIELD OF THE INVENTION

The invention belongs to the technical field of mechanical engineering, and relates to a transmission device, in particular to a transmission speed reduction device suitable for an industrial robot.

BACKGROUND

The transmission speed reduction device is a key component of the industrial robot. It is mainly used to match the speeds and transmit torques between the drive mechanism and the actuator, thereby achieving the goal of reducing the speed and increasing the torque.

At present, in the field of industrial robot technology, the transmission speed reduction devices frequently used include worm-worm wheel reducers, harmonic reducers and planetary reducers, etc. However, the worm-worm wheel reducer has a cumbersome structure, low transmission efficiency, poor precision, and different axes for the input and output, and poor running stability; the core component of the harmonic reducer produces periodic deformation during operation, which is prone to damage due to fatigue, and the impact resistance and rigidity of the whole machine are poor, and the input speed is limited. Although the planetary reducer has excellent performance on the whole and can meet the operation requirements for the device, the requirements for raw material selection of the components, manufacturing process and processing precision and the like are very high. The device is expensive.

SUMMARY OF INVENTION

The object of the present invention is to overcome the defects of the prior art and provide a transmission speed reduction device of high-precision and a large-transmission ratio, which has a compact structure, has a small size, has low friction wear, can bear large load, has simple production process, has low price, and the like, and is suitable for the scenarios of precision heavy load and large transmission ratio of industrial robots.

In order to realize the above object, the present invention provides the technical solutions as follows.

A transmission speed reduction device including a worm assembly, a worm wheel assembly and an output axle which are disposed in a casing, wherein the worm wheel assembly is accommodated in the worm assembly and an input axle is further disposed on the worm assembly, characterized in that, the worm assembly and the worm wheel assembly achieve primary stage mesh transmission there between by means of worm teeth which are provided on the worm assembly and a first worm wheel tooth which is provided on the worm wheel assembly. The worm wheel assembly and the output axle achieve secondary stage mesh transmission by means of an intermediate rotary body which is provided on the worm wheel assembly and a rotary disc assembly which is fixed on the output axle.

Preferably, the output axle and the input axle are respectively disposed at opposite ends of the transmission speed reduction device, and the axes of the output axle and the input axle coincide with each other.

Preferably, the axis of the worm wheel assembly is parallel to the axis of the output axle, and there are three worm wheel assemblies evenly distributed in the circumferential direction of the output axle.

Preferably, the intermediate rotary body of the worm wheel assembly is disc-shaped and is located in the middle of the worm wheel assembly, and the axis thereof is coaxial with the axis of rotation of the worm wheel assembly.

Preferably, the intermediate rotary body is circumferentially provided with smooth grooves for cooperation with the rotary disc assembly.

Preferably, the rotary disc assembly is disc-shaped and is circumferentially provided with the second worm wheel teeth for cooperation with the intermediate rotary body.

Preferably, the worm assembly comprises an input axle, a lower casing, an upper casing and first worm wheels, the lower casing and the upper casing are both approximately hemispherical and are assembled together to form an approximately spherical cavity for accommodating the worm wheel assembly therein. The upper portion of the spherical cavity is open, and the lower portion of the spherical cavity is closed by a worm base which has a disc shape. The input axle is disposed under the worm base. The inner sides of the lower casing and the upper casing are provided with first worm teeth for meshing with the worm wheel assembly, and the first worm teeth are helical teeth.

Preferably, the axes of the lower casing, upper casing, spherical cavity, worm base and input axle coincide with each other.

Preferably, the casing is generally substantially cylindrical in shape, and is comprised of a disc-shaped lower base, an upper base, and a cylindrical intermediate base. The lower base is centrally provided with a downwardly concave circular boss. The inside of the circular boss is provided with a first thrust bearing for supporting the worm base of the worm assembly. The circular boss is also centrally provided with a first angular contact ball bearing for supporting an input axle of the worm assembly. The upper base is centrally provided with a first upper bearing for supporting the output axle. The upper base is further provided with three second upper bearings which are circumferentially evenly distributed, for supporting the upper ends of the rotary shafts of the three worm wheel assemblies.

Preferably, the worm wheel assembly is assembled into an approximately sphere by an approximately hemispherical lower worm wheel body and an approximately hemispherical upper worm wheel body, and a disk-shape intermediate rotary body is provided between the lower worm wheel body and the upper worm wheel body. A rotary shaft is arranged in the axial direction, and the lower end and the upper end of the rotary shaft extend out from the lower and upper portions of the approximately sphere in the axial direction respectively. Each of the lower worm wheel body and the upper worm wheel body is provided with a circulating groove. Each groove of the lower worm wheel body and the upper worm wheel body is comprised of a spiral groove disposed on the outer surface thereof and a guide groove disposed inside thereof which connects with the spiral groove consecutively. The groove is filled full with spherical first worm wheel teeth. And the first worm wheel teeth can reciprocate in the groove.

Preferably, the lower worm wheel body and the upper worm wheel body are further provided with worm wheel teeth mounting bodies for mounting the first worm wheel teeth in the grooves of the lower worm wheel body and the upper worm wheel body during factory assembly or inspection.

Preferably, the rotary disc assembly has a disk shape and is comprised of a circular lower rotary disc and a circular upper rotary disc. The second worm wheel teeth are evenly disposed between the lower rotary disc and the upper rotary disc in the outer circumferential direction, and the second worm wheel teeth mesh with the grooves on the intermediate rotary body of the worm wheel assembly to realize power transmission. The second worm wheel teeth can also be shaped as rotating balls. A through hole is provided in the middle of the rotary disc assembly for connecting and fixing the output axle.

Preferably, the output axle is connected to a worm base of the worm assembly via an output axle mounting assembly. The output axle mounting assembly is disc-shaped, and is centrally provided with a downwardly projecting cylindrical output axle mounting plate, and a second angular contact ball bearing for mounting the output axle. The output axle mounting plate is further provided with three circumferentially evenly distributed deep groove ball bearings for supporting the lower ends of the rotary shafts. The deep groove ball bearing cooperates with the second upper bearing of the upper base of the casing for axial positioning of the worm wheel assembly.

Preferably, the output axle mounting assembly is connected to a worm base of the worm assembly via a chassis assembly. The chassis assembly is disc-shaped and includes a disk-shaped chassis and a second thrust bearing disposed in the middle of the chassis. The second thrust bearing is configured for supporting the output axle mounting plate.

Preferably, the output axle is a diameter-varying cylinder, and connects from top to bottom with the first upper bearing on the base of the casing, the through hole in the middle of the rotary disc assembly, and the second angular contact ball bearing on the output axle mounting assembly.

The invention provides a transmission speed reduction device which has a compact structure, a large transmission ratio, is high precision, has low friction wear, and is easily applicable in the development of industrial production and manufacturing, while being low cost and being suitable for precision heavy load transmission scenarios having large transmission ratio requirements and volume restrictions, such as joints of industrial robots and the like.

Figure 1:
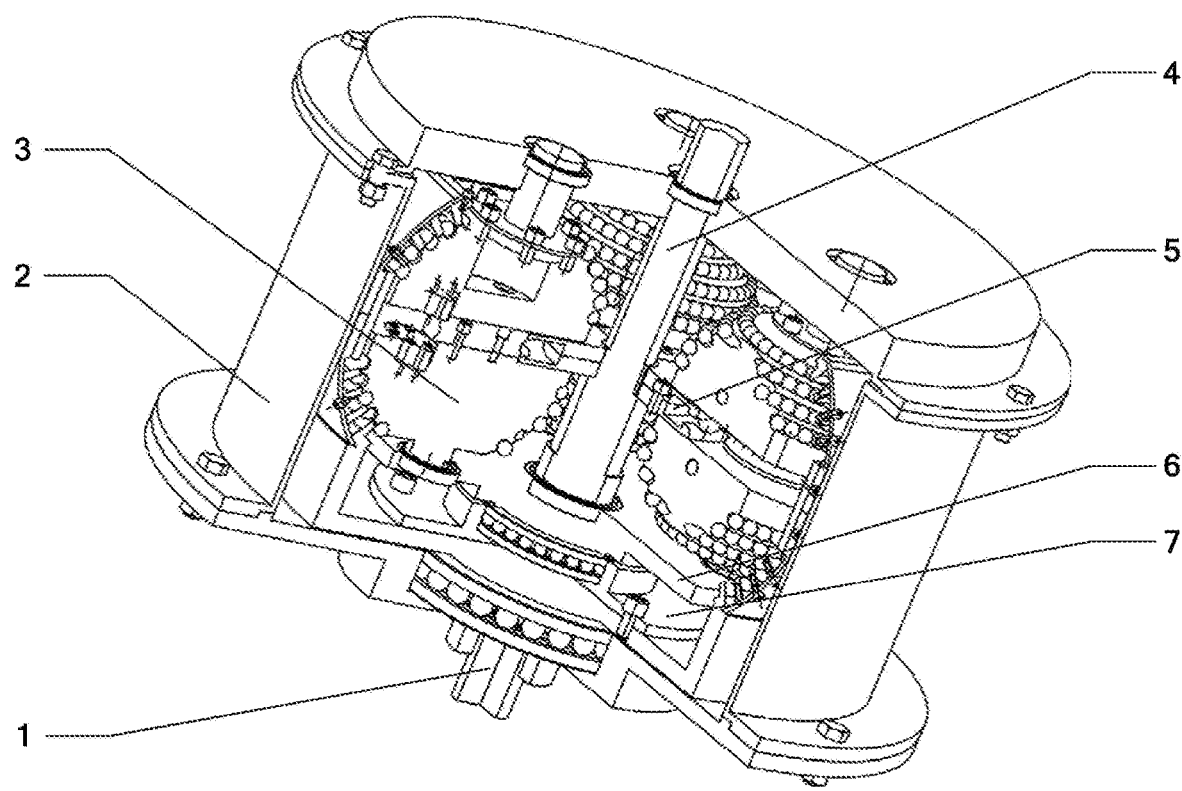
FIG. 1 is a cross-sectional view showing the overall structure of a transmission speed reduction device according to the present invention.

LIST OF REFERENCE NUMBERS 1 worm assembly, 11 input axle, 12 lower casing, 13 first bolt, 14 upper casing, 15 first worm teeth, 16 spherical cavity, 17 worm base, 18 bolt hole;
2 casing, 21 first thrust bearing, 22 first angular contact ball bearing, 23 lower base, 24 second bolt, 25 middle base, 26 upper base, 27 first upper bearing, 28 second upper bearing;
3 worm wheel assembly, 31 lower worm wheel body, 32 intermediate rotary body, 33 upper worm wheel body, 34 first worm wheel teeth, 35 third bolt, 36 rotary shaft, 37 hexagon socket bolt, 38 fourth Bolt, 39 worm wheel teeth mounting body;
4 output axle;
5 rotary disc assembly, 51 lower rotary disc, 52 second worm wheel teeth, 53 upper rotary disc, 54 sixth bolt, 55 through hole;
6 output axle mounting assembly, 61 output axle mounting plate, 62 deep groove ball bearing, 63 second angular contact ball bearing;
7 chassis assembly, 71 chassis, 72 seventh bolt, 73 second thrust bearing.

DETAILED DESCRIPTION

A detailed description of a transmission speed reduction device according to the present invention will be further illustrated below with reference to the embodiments shown in FIGS. 1 to 17. The transmission speed reduction device of the present invention is not limited to the contexts of the following embodiments.

As shown in FIGS. 1 to 4, the present invention provides a transmission speed reduction device including a worm assembly 1, a casing 2, a worm wheel assembly 3, an output axle 4, a rotary disc assembly 5, an output axle mounting assembly 6 and a chassis assembly 7. The transmission speed reduction device is substantially cylindrical shaped on the whole, and the output axle 4 and the input axle 11 of the worm assembly 1 are vertically located above and below the transmission speed reduction device respectively, and coincide with the axis of the transmission speed reduction device.

Figure 5:
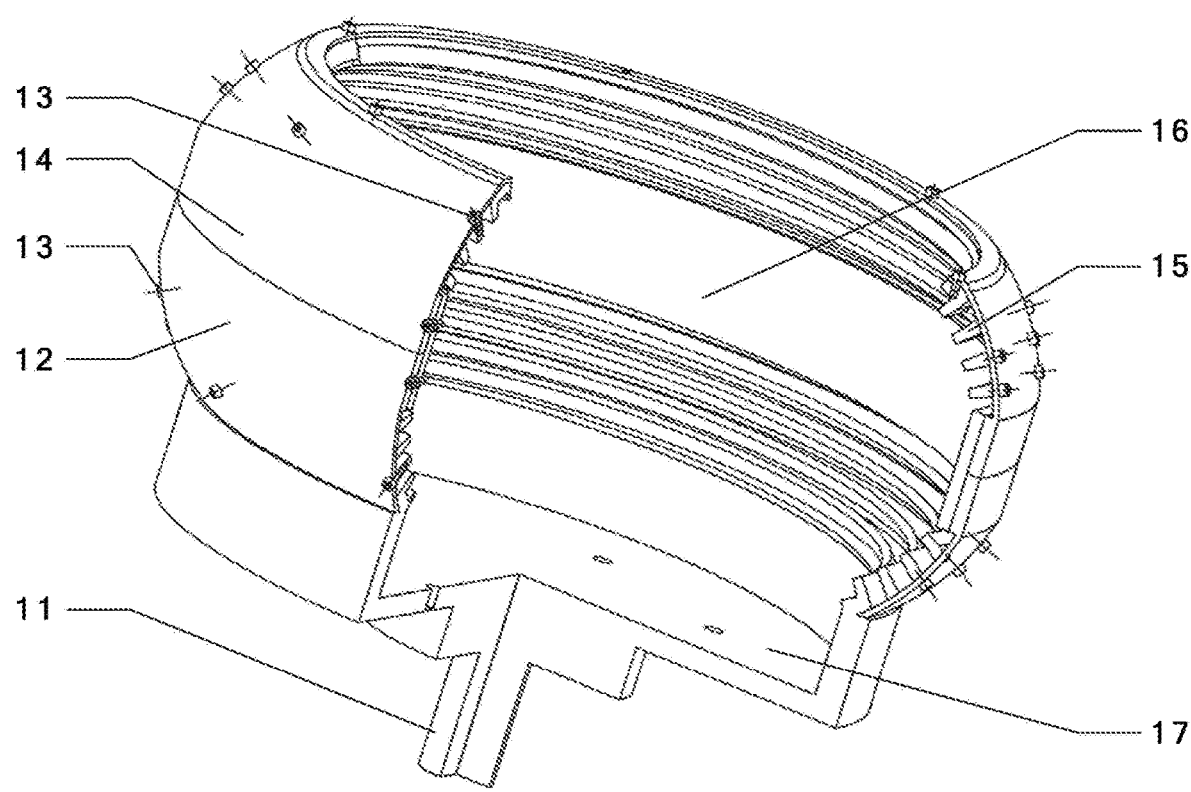
FIG. 5 is a cross-sectional view showing a worm assembly of a transmission speed reduction device according to the present invention.
Figure 6:
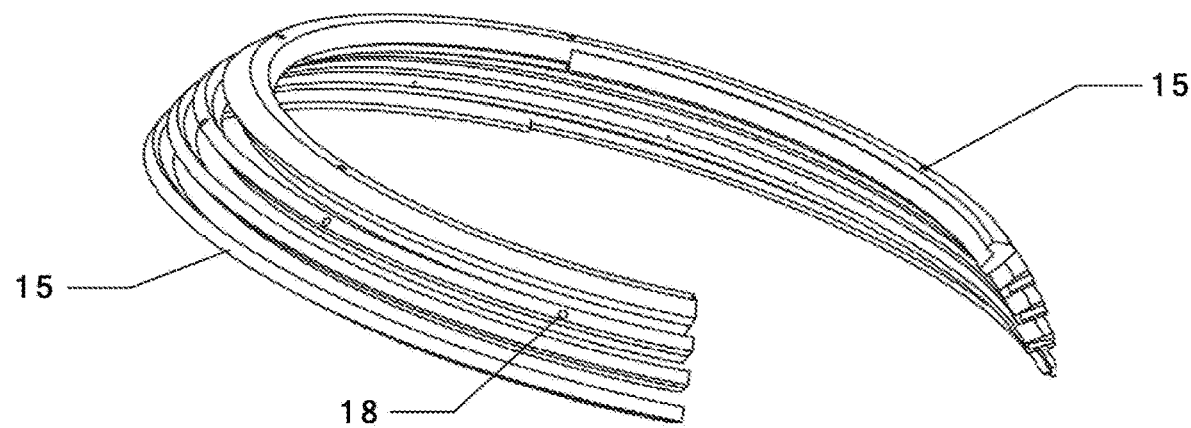
FIG. 6 is a cross-sectional view showing worm teeth of a transmission speed reduction device according to the present invention.

As shown in FIGS. 5 to 6, the worm assembly 1 includes an input axle 11, a lower casing 12, a first bolt 13, an upper casing 14 and first worm teeth 15. The lower casing 12 and the upper casing 14 are both approximately hemispherical and are put together to form an approximately spherical cavity 16 for accommodating the worm wheel assembly 3 therein. The upper portion of the spherical cavity 16 is open, and the lower portion of the spherical cavity 16 is closed by a worm base 17 which has a disc shape. An input axle 11 is disposed under the worm base 17. The axes of the lower casing 12, the upper casing 14, the spherical cavity 16, the worm base 17 and the input axle 11 coincide with each other. The inner sides of the lower casing 12 and the upper casing 14 are provided with first worm teeth 15 for cooperation with the worm wheel assembly 3, and the first worm teeth 15 are helical teeth.

Preferably, the first worm teeth 15 are fixed on inside of the lower casing 12 and the upper casing 14 by means of a plurality of first bolts 13. The advantage of such arrangement is that, after the first worm teeth 15 are independently processed to obtain the teeth shapes, the upper case 14 and the lower case 12 and the first worm teeth 15 are combined and fixed together by means of the first bolts 13 tightening within the bolt holes 18 of the first worm teeth 15, which can overcome the difficulty of integrally forming the spiral first worm teeth 15 within the spherical cavity 16 and at the same time effectively improves the machining precision of the first worm teeth 15.

Figure 7:
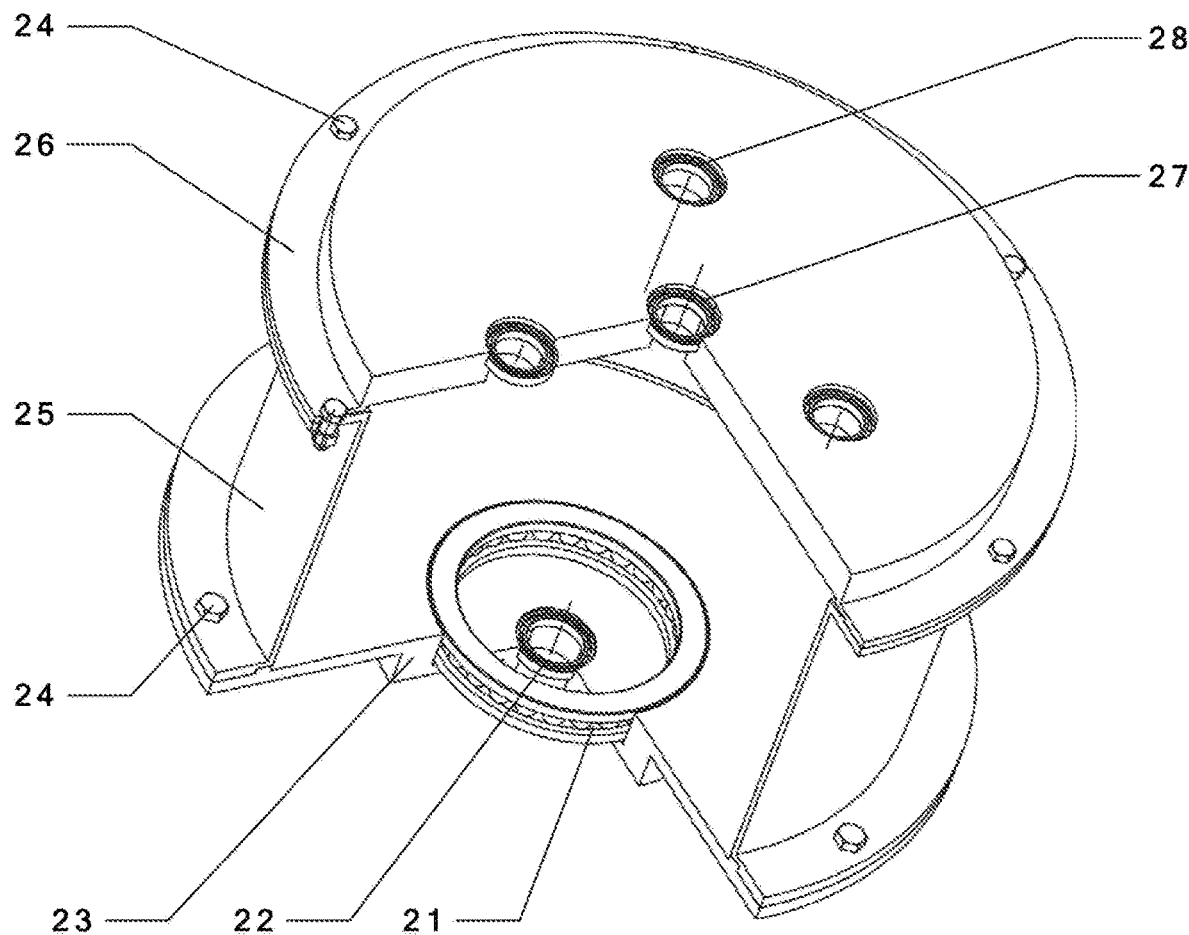
FIG. 7 is a cross-sectional view showing a casing of a transmission speed reduction device according to the present invention.
Figure 8:
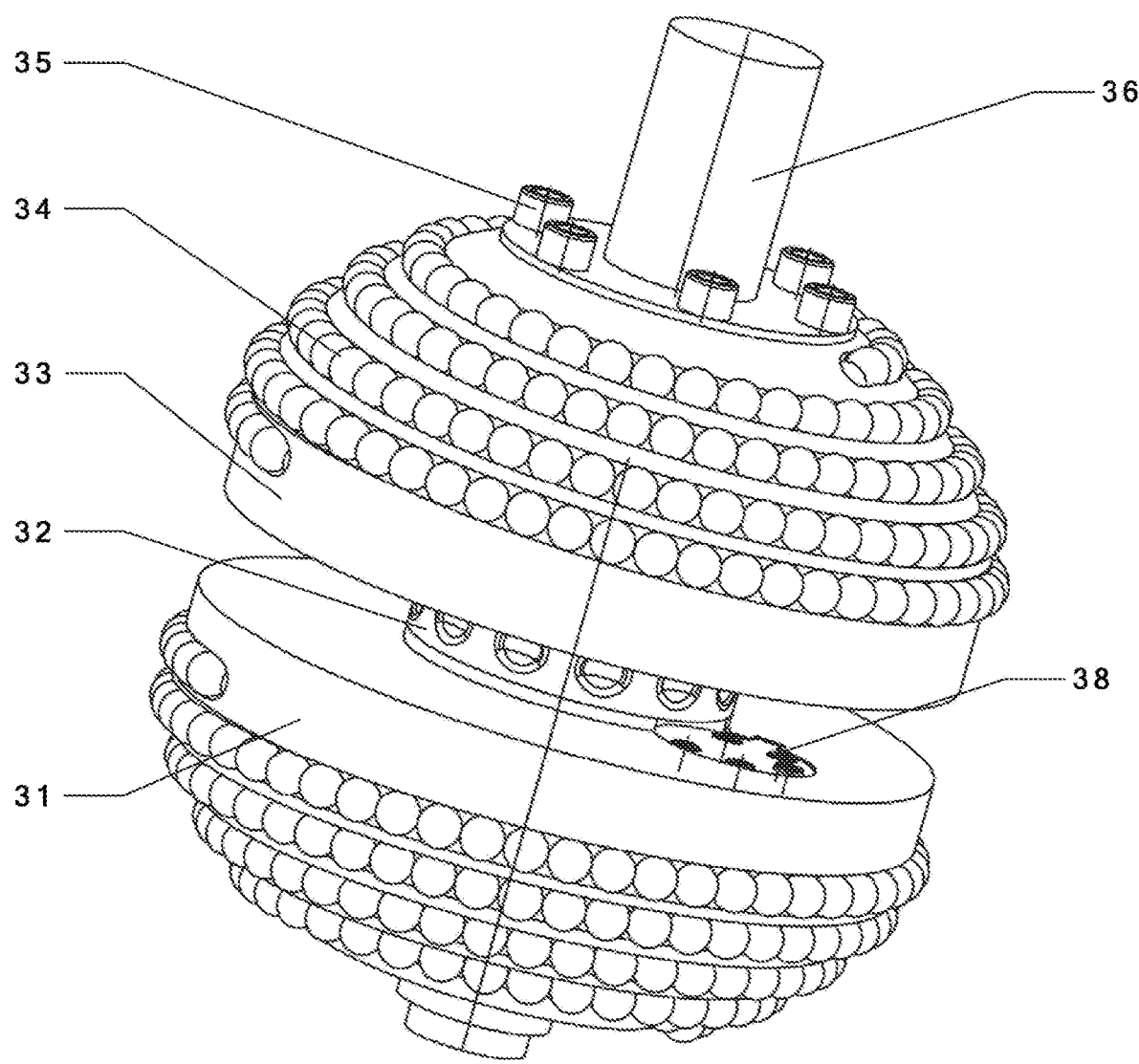
FIG. 8 is a schematic view showing the overall structure of a worm wheel assembly of a transmission speed reduction device according to the present invention.

As shown in FIG. 7, the casing 2 is generally substantially cylindrical in shape, and is comprised of a disc-shaped lower base 23, an upper base 26, and a cylindrical intermediate base 25 which are connected by means of a plurality of second bolts 24. The lower base 23 is centrally provided with a downwardly concave circular boss. The inside of the circular boss is provided with a first thrust bearing 21 for supporting the worm base 17 of the worm assembly 1. The circular boss is also centrally provided with a first angular contact ball bearing 22 for supporting an input axle 11 of the worm assembly 1. The upper base 26 is centrally provided with a first upper bearing 27 for supporting the output axle 4. The upper base 26 is further provided with three second upper bearings 28 which are circumferentially evenly distributed, for supporting the upper ends of the rotary shafts 36 of the three worm wheel assemblies 3.

After the assembly of the device as a whole is completed, only the output axle 4 and the input axle 11 of the worm assembly 1 vertically extend out above and below the casing 2 respectively, and other components are mounted inside of the casing 2. By adopting the designs of the cylindrical casing 2, and the power input and output directions in coincide with the geometric axis direction of the device, and the geometric axis in coincide with the center of gravity, the overall structure of the device is compact and small sized, and the operation is stable.

As shown in FIGS. 8 to 12, the worm wheel assembly 3 comprises an approximately hemispherical lower worm wheel body 31 and an approximately hemispherical upper worm wheel body 33 which are assembled into an approximately sphere, and a disk-shape intermediate rotary body 32 is provided between the lower worm wheel body 31 and the upper worm wheel body 33. A rotary shaft 36 is arranged in the axial direction, and the lower end and the upper end of the rotary shaft 36 extend out from the lower and upper portions of the approximately sphere in the axial direction respectively.

Each of the lower worm wheel body 31 and the upper worm wheel body 33 is provided with a circulating groove. Specifically, the groove of the lower worm wheel body 31 is comprised of a spiral groove disposed on the outer surface thereof and a guide groove disposed inside thereof which connects with the spiral groove consecutively. In turn, the groove is filled full with spherical first worm wheel teeth 34, and the first worm wheel teeth 34 can reciprocate in the groove. The structure of the groove of the upper worm body 33 is similar to that of the groove of the lower worm wheel 31.

In one embodiment, the upper worm wheel body 33 is connected to the intermediate rotary body 32 via hexagon socket bolts 37, and the intermediate rotary body 32 is connected to the lower worm wheel body 31 via the fifth bolts 30. In another specific embodiment, the rotary shaft 36 may be of an integrated structure and designed as an integrated component. A separate structure may also be employed. When the separate structure is adopted, the upper portion of the rotary shaft 36 is mounted above the upper worm wheel body 33 by a plurality of third bolts 35. The lower portion of the rotary shaft 36 may be embodied the same as that of the upper portion, or may be integrally formed with the lower worm wheel body 31.

Figure 9:
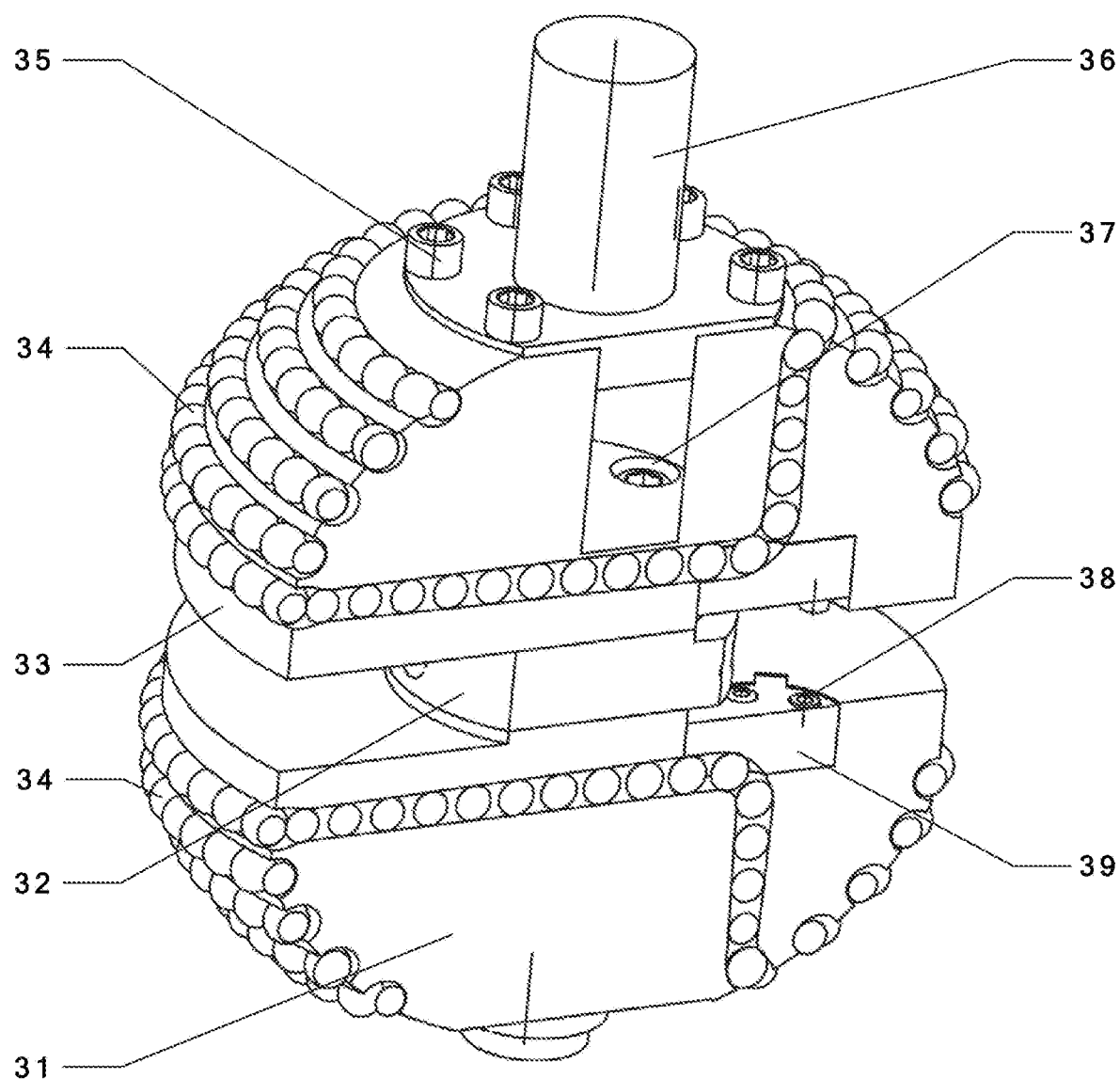
FIG. 9 is a cross-sectional view showing a worm wheel assembly of a transmission speed reduction device according to the present invention.
Figure 10:
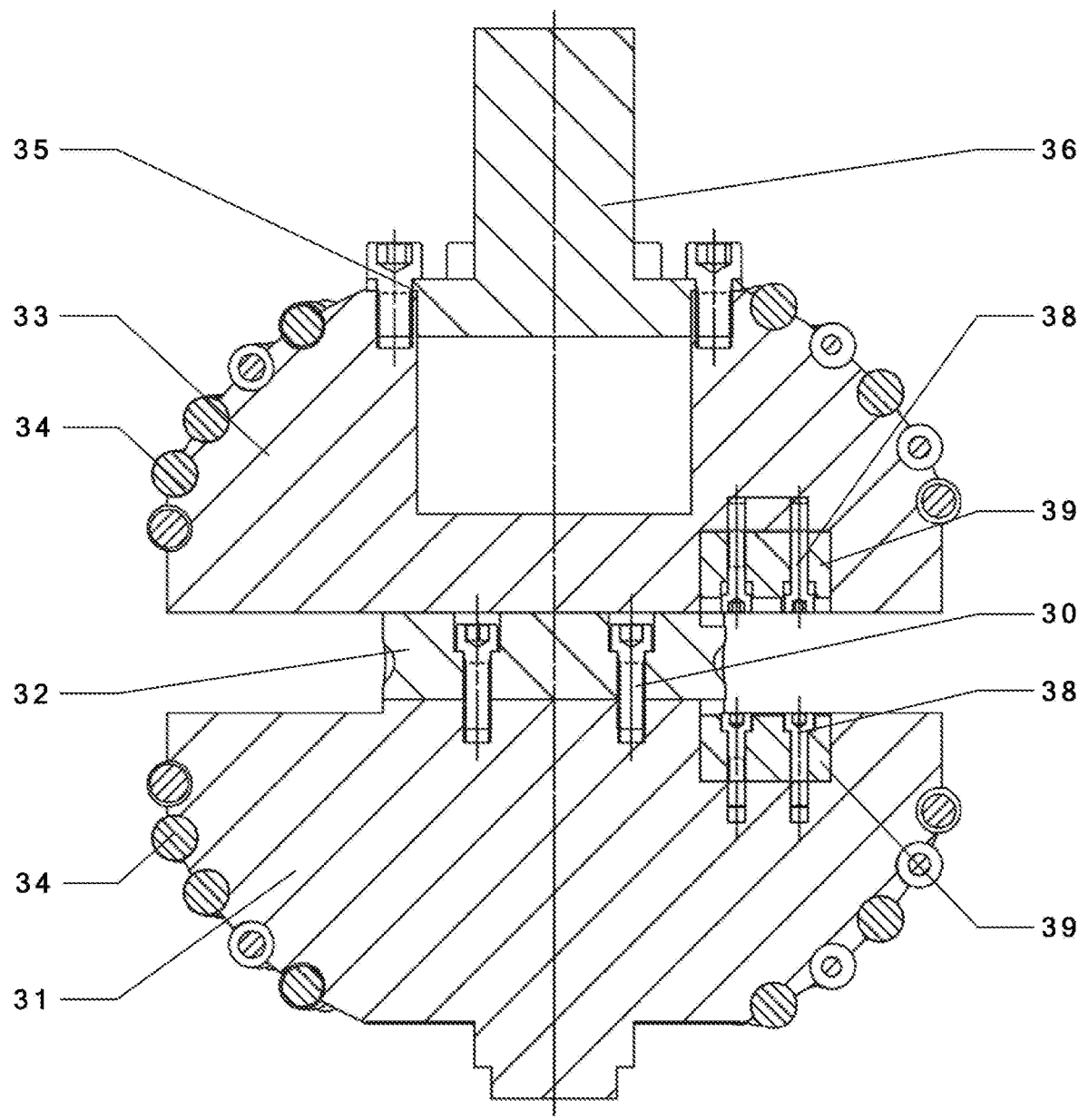
FIG. 10 is another cross-sectional view of a worm wheel assembly of a transmission speed reduction device according to the present invention.
Figure 11:
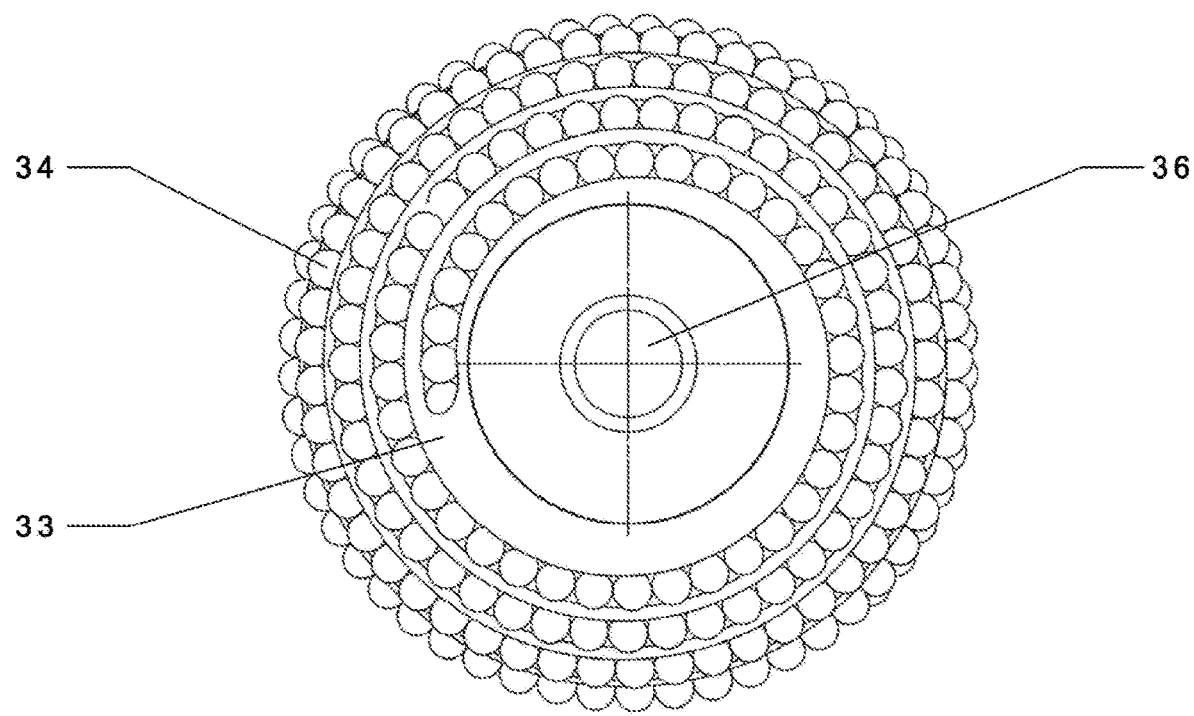
FIG. 11 is a top view of a worm wheel assembly of a transmission speed reduction device according to the present invention.
Figure 12:
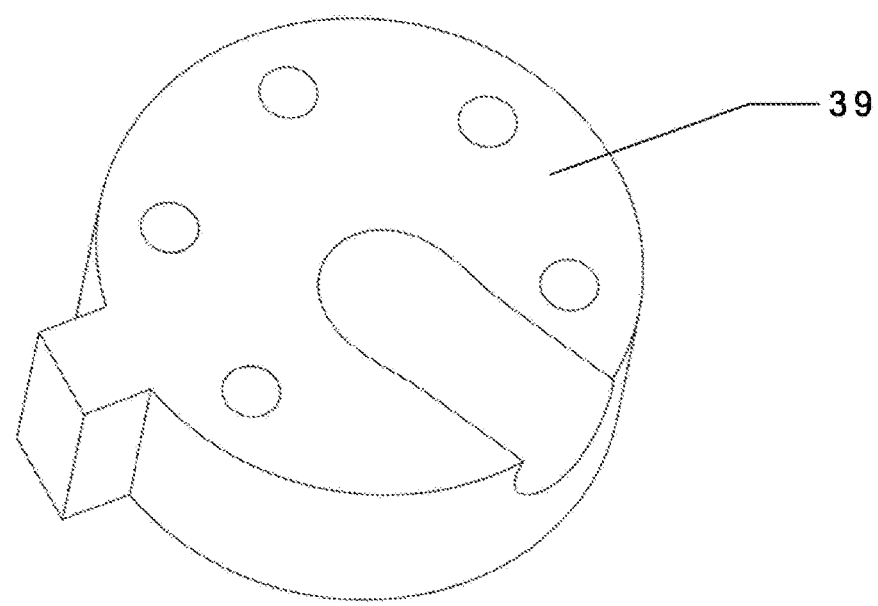
FIG. 12 is a schematic view showing the overall structure of worm wheel teeth mounting body of a transmission speed reduction device according to the present invention.

The intermediate rotary body 32 is circumferentially evenly provided with smooth grooves for cooperation with the rotary disc assembly 5. The lower worm wheel body 31 and the upper worm wheel body 33 are further provided with worm wheel teeth mounting bodies 39 for mounting the first worm wheel teeth 34 in the grooves of the lower worm wheel body 31 and the upper worm wheel body 33 during factory assembly or inspection. Specifically as shown in FIG. 9, the lower worm wheel body 31 is provided with a mounting notch for cooperation with the worm wheel teeth mounting body 39, and the mounting notch is in communication with the groove of the lower worm wheel body 31. In assembly, the first worm wheel teeth 34 are arranged in the groove of the lower worm wheel body 31 via the mounting notch firstly, and then the worm wheel teeth mounting body 39 is inserted into the mounting notch to realize the closing of the groove. Finally, the worm wheel teeth mounting body 39 is fixed by the plurality of fourth bolts 38 so as to realize fixing between the mounting notch and the worm wheel teeth mounting body. The embodiment of the upper worm wheel body 33 is similar to that of the lower worm wheel body 31.

The present invention proposes the configuration of the three worm wheel assemblies 3 and the worm assembly 1 which adopts a type of small tooth number difference mesh mode to realize a large wheel ratio output.

The teeth surface of the first worm teeth 15 is enveloped by a sphere, and meshes from inside. The first worm wheel teeth 34 are shaped as rotating balls and reciprocate in a rolling mesh manner in the grooves of the lower worm wheel body 31 and the upper worm wheel body 33, and the rolling mesh motion converts the sliding friction between the worm wheel and the worm into rolling friction, thereby reducing the meshing resistance.

Figure 13:
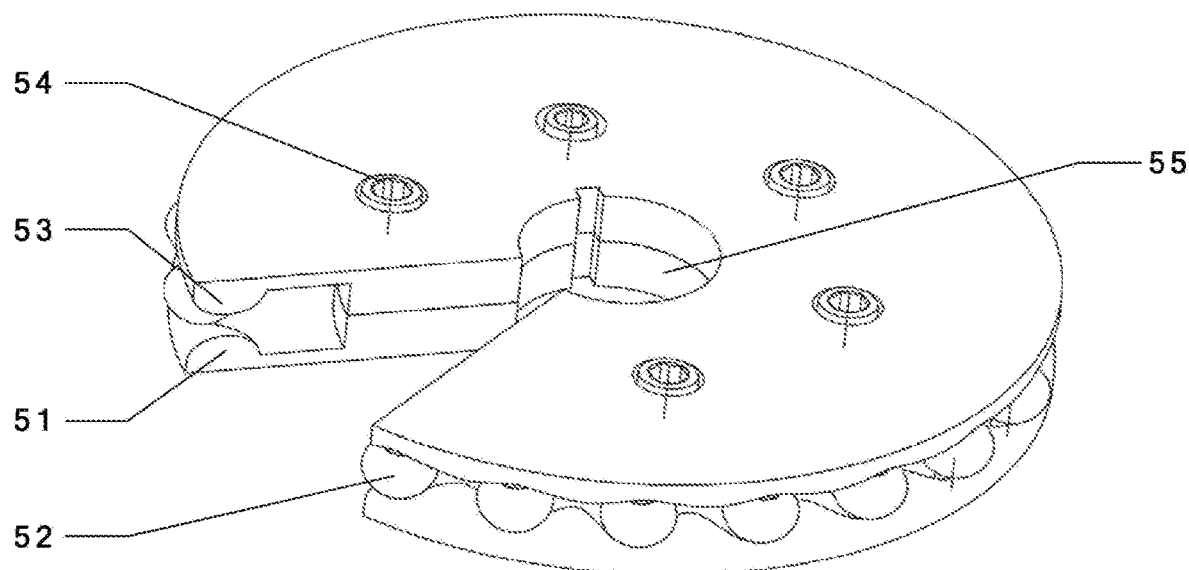
FIG. 13 is a schematic view showing the overall structure of a rotary disc assembly of a transmission speed reduction device according to the present invention.
Figure 14:
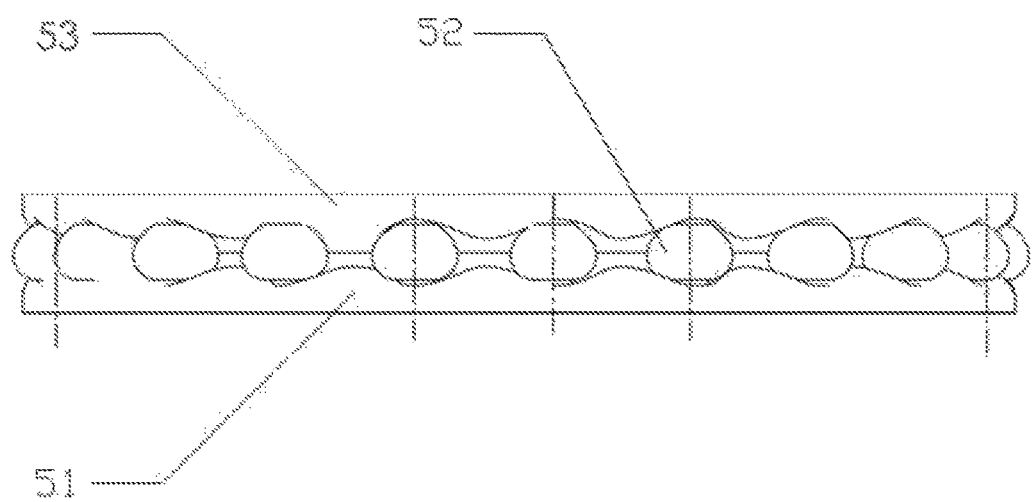
FIG. 14 is a front view of the rotary disc assembly of a transmission speed reduction device according to the present invention.

As shown in FIGS. 13 to 14, the rotary disc assembly 5 has a disk shape and is comprised of a circular lower rotary disc 51 and a circular upper rotary disc 53. The second worm wheel teeth 52 are evenly disposed between the lower rotary disc 51 and the upper rotary disc 53 in the outer circumferential direction, and the second worm wheel teeth 52 mesh with the grooves on the intermediate rotary body 32 of the worm wheel assembly 3 to realize power transmission.

Preferably, the second worm wheel teeth 52 can also be shaped as rotating balls. A through hole 55 is provided in the middle of the rotary disc assembly 5 for connecting and fixing the output axle 4. In one embodiment, the lower rotary disc 51 and the upper rotary disc 53 are connected and fixed by a plurality of sixth bolts 54.

Figure 15:
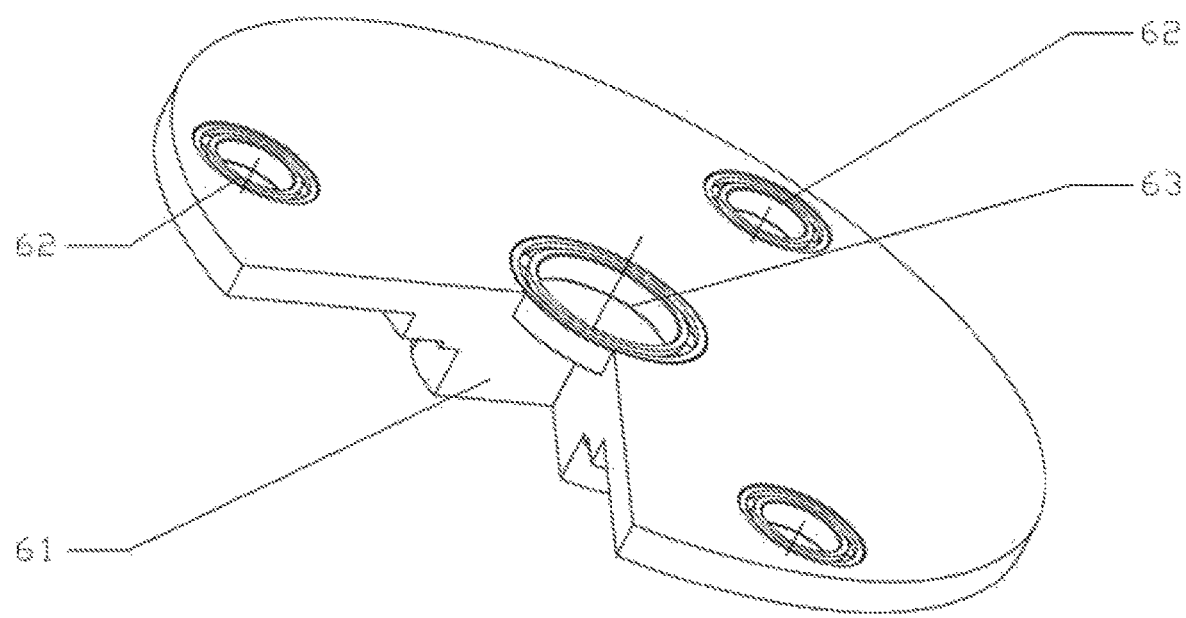
FIG. 15 is a schematic view showing the overall structure of an output axle mounting plate assembly of a transmission speed reduction device according to the present invention.

As shown in FIG. 15, the output axle mounting assembly 6 is disc-shaped, and is centrally provided with a downwardly projecting cylindrical output axle mounting plate 61, and a second angular contact ball bearing 63 for mounting the output axle 4. The mounting plate assembly 6 is further provided with three circumferentially evenly distributed deep groove ball bearings 62, for supporting the lower ends of the rotary shafts 36. The deep groove ball bearing 62 cooperates with the second upper bearing 28 of the upper base 26 of the casing 2 for axial positioning of the worm wheel assembly 3. At the same time, the operation manner of the three worm wheel assemblies 3 being meshed with the worm assembly 1 effectively eliminates the flank clearances and the dynamic balance problem derived therefrom, thereby ensuring smooth operation of the device.

Figure 16:
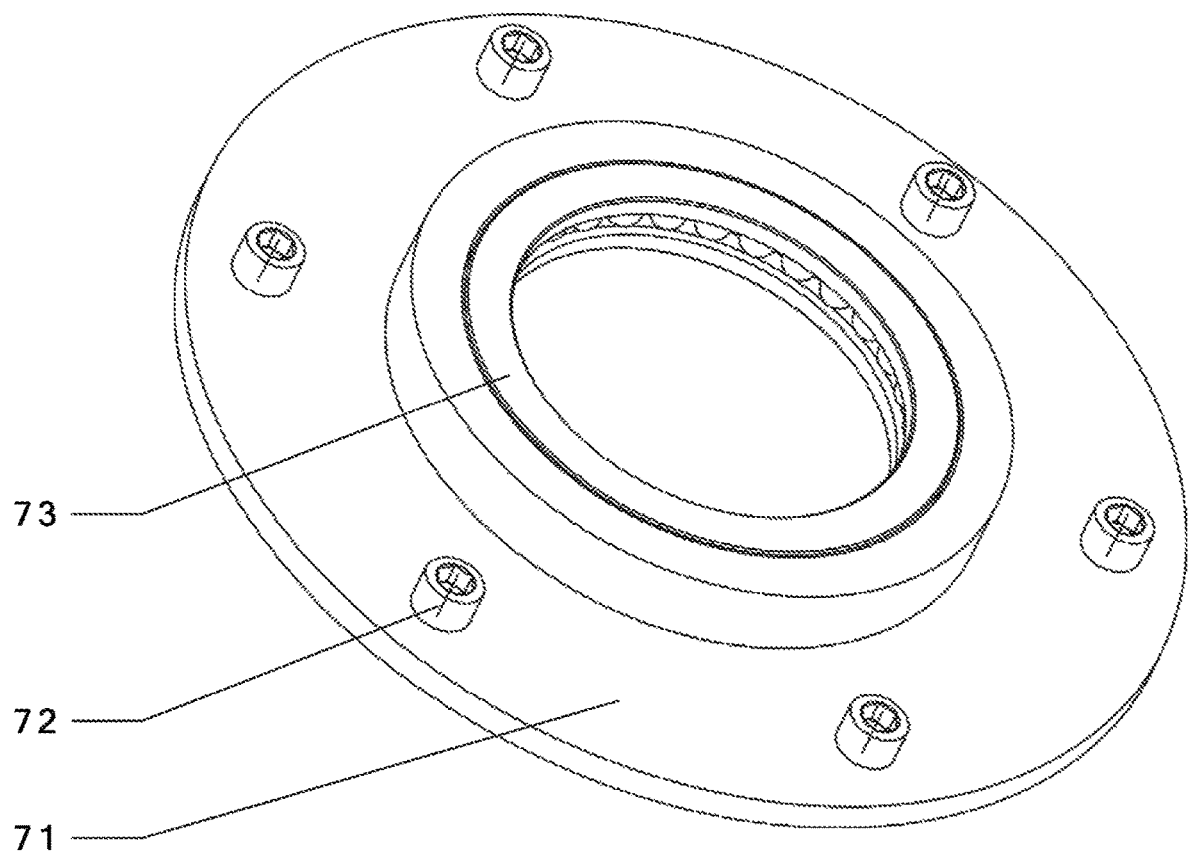
FIG. 16 is a schematic view showing the overall structure of a chassis assembly of a transmission speed reduction device according to the present invention.

As shown in FIG. 16, the chassis assembly 7 is disc-shaped and includes a disk-shaped chassis 71 and a second thrust bearing 73 disposed in the middle of the chassis 71. The second thrust bearing 73 is configured for supporting the output axle mounting plate 61. The chassis assembly 7 is fixed onto the worm base 17 of the worm assembly 1 by seventh bolts 72.

Figure 17:
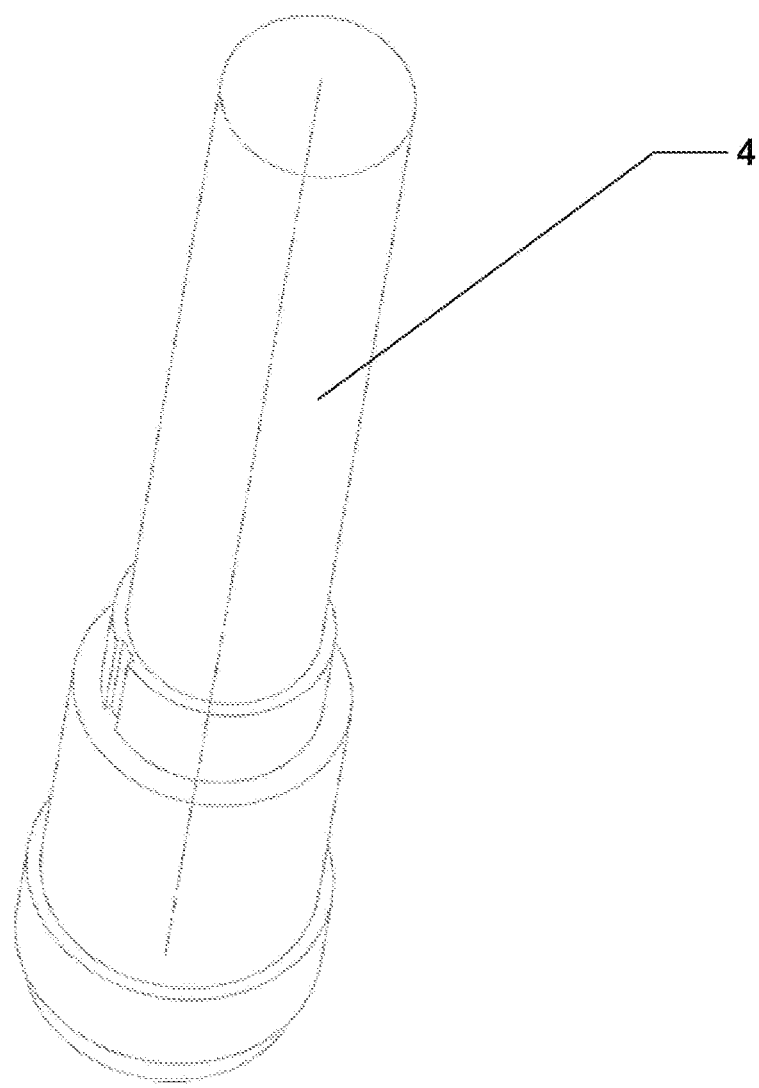
FIG. 17 is a schematic view showing the structure of an output axle of a transmission speed reduction device according to the present invention.

As shown in FIG. 17 and FIG. 1, the output axle 4 is a diameter-varying cylinder, and connects from top to bottom with the first upper bearing 27 on the base 26 of the casing 2, the through hole in the middle of the rotary disc assembly 5, and the second angular contact ball bearing 63 on the output axle mounting assembly 6. In one embodiment, the output axle 4 can be fixedly connected to the rotary disc assembly 5 by a key. Preferably, the output axle 4 and the input axle 11 can both be arranged as hollow structures, which is convenient for wiring therein on the one hand, and renders the overall structure of the device more compact and reasonable on the other hand.

Figure 2:
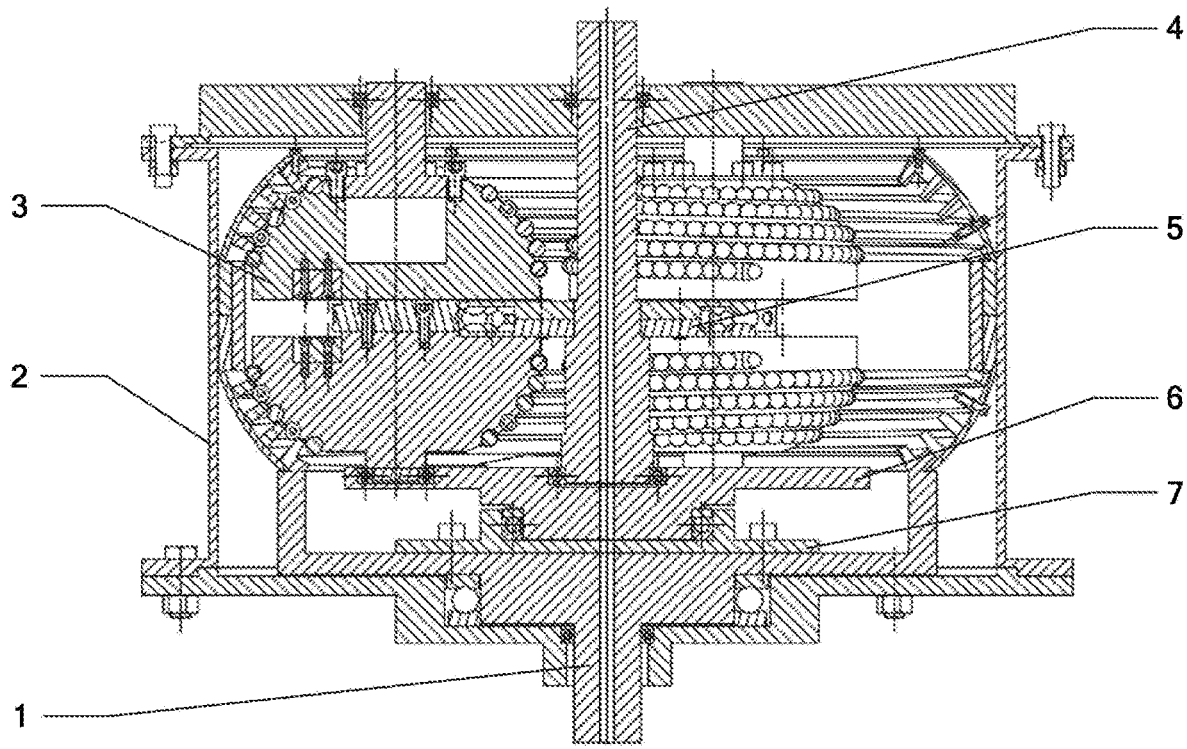
FIG. 2 is another cross-sectional view showing the overall structure of a transmission speed reduction device according to the present invention.
Figure 3:
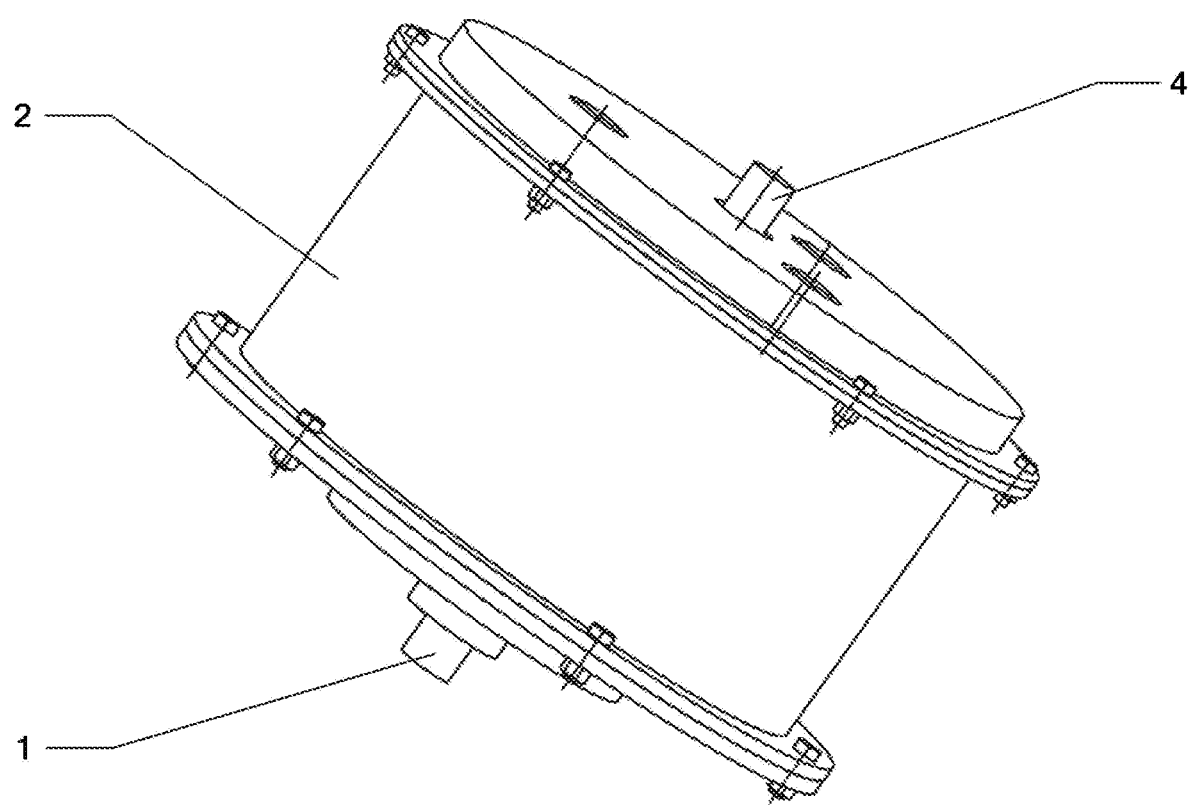
FIG. 3 is a schematic view showing the overall structure of a transmission speed reduction device according to the present invention.
Figure 4:
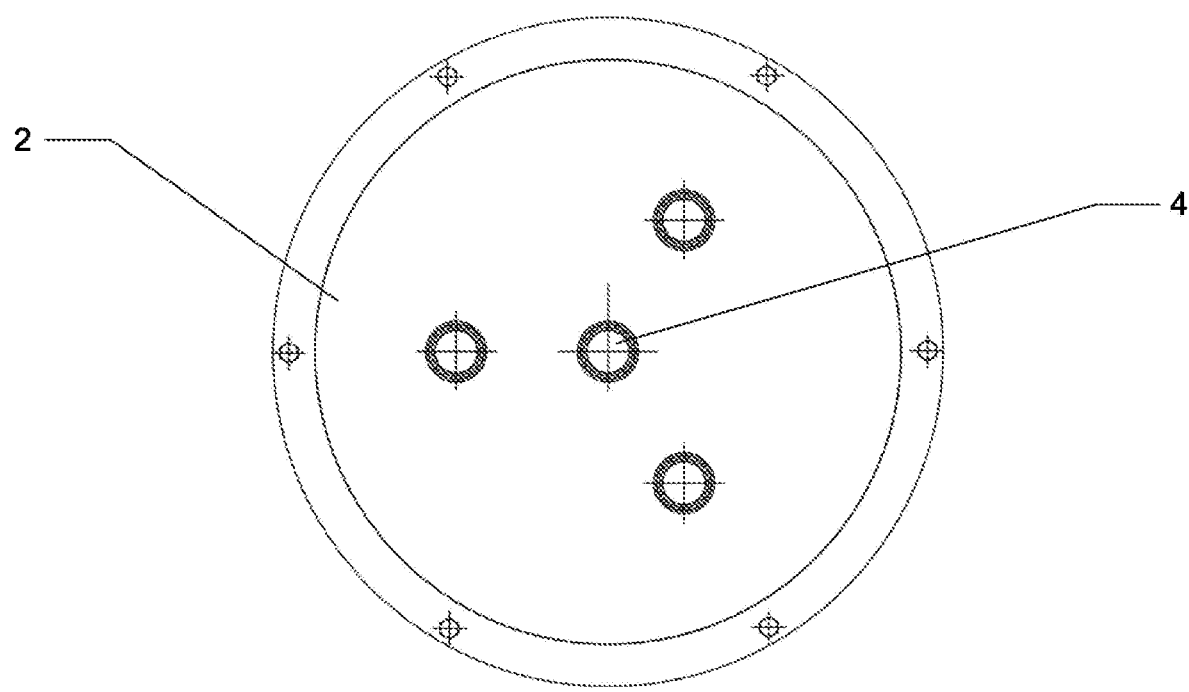
FIG. 4 is a top view of a transmission speed reduction device according to the present invention.

The assembling manner of a transmission speed reduction device according to the present invention is shown in FIG. 1 and FIG. 2. The worm assembly 1 is mounted and positioned on the lower base 23 of the casing 2 via a first angular contact ball bearing 22 and a first thrust bearing 21. The chassis assembly 7 is fixedly connected onto the worm base 17 of the worm assembly 1 by seventh bolts 72. The output axle mounting assembly 6 is mounted on the chassis 71 via a second thrust bearing 73. There are provided three worm wheel assemblies 3 in total, and the lower end of the worm wheel assembly is connected to the output axle mounting plate 61 via the deep groove ball bearing 62. The upper end of the worm wheel assembly 3 is connected to the upper base 26 via a second upper bearing 28, and the worm wheel assembly 3 is in meshing connection with the worm assembly 1, and the lower end of the output axle 4 is mounted on the output axle mounting plate 61 via a second angular contact ball bearing 63. The upper end of the output axle 4 is mounted on the upper base 26 via a second upper bearing 28, and the rotary disc assembly 5 is in meshing connection with the intermediate rotary body 32.

The operation principle and process of a transmission speed reduction device according to the present invention are as follows: the power input is obtained by the worm assembly 1 which is mounted and positioned on the lower base 23 by means of the first thrust bearing 21 and the first angular contact ball bearing 22, and thereafter, the first worm teeth 15 of the worm assembly 1 mesh with the first worm wheel teeth 34 of the worm wheel assemblies 3 and drive the three worm wheel assemblies 3 to rotate, so as to achieve the primary stage of transmission reduction. The groove of the intermediate rotary body 32 of the worm wheel assembly 3 is meshed with the rotary disc assembly 5 which is fixed on the output axle 4 and drives the output axle 4 to rotate, so as to achieve the secondary stage of transmission reduction.

By means of two-stage transmission reduction, a large transmission ratio, a high torque, a low friction loss and high precision operation of the transmission speed reduction device are finally realized.

The context above is a detailed description of the present invention in connection with the specific preferred embodiments, and the specific embodiments of the present invention are not limited to the context above. It will be apparent to those skilled in the art that simple adjustments, modifications and replacements may be made to the present invention without departing from the spirit and scope of the invention.

What is claimed is:

1. A transmission device including a worm assembly (1) and a worm wheel assembly (3) which are disposed in a casing (2), wherein the worm wheel assembly (3) is accommodated in the worm assembly (1), characterized in that, the worm wheel assembly (3) is assembled into an approximately sphere by an approximately hemispherical lower worm wheel body (31) and an approximately hemispherical upper worm wheel body (33); each of the lower worm wheel body (31) and the upper worm wheel body (33) is provided with a circulating groove; each groove of the lower worm wheel body (31) and the upper worm wheel body (33) is comprised of a spiral groove disposed on the outer surface thereof and a guide groove disposed inside thereof which connects with the spiral groove consecutively; the groove is filled full with spherical first worm wheel teeth (34); and the first worm wheel teeth (34) can reciprocate in the groove, so as to achieve primary stage mesh transmission by meshing with the worm teeth of the worm assembly (1) in a rolling manner.

2. The transmission device according to claim 1, wherein an output axle (4) is further provided in the casing (2), an input axle (11) is further disposed on the worm assembly (1), the output axle (4) and the input axle (11) are respectively disposed at opposite ends of the transmission device, and the axes of the output axle (4) and the input axle (11) coincide with each other.

3. The transmission device according to claim 2, wherein the axis of the worm wheel assembly (3) is parallel to the axis of the output axle (4), and there are three worm wheel assemblies (3) evenly distributed in the circumferential direction of the output axle (4).

4. The transmission device according to claim 3, wherein a disk-shape intermediate rotary body (32) is provided between the lower worm wheel body (31) and the upper worm wheel body (33), the intermediate rotary body (32) of the worm wheel assembly (3) is disc-shaped and is located in the middle of the worm wheel assembly (3), and the axis thereof is coaxial with the axis of rotation of the worm wheel assembly (3), wherein the worm wheel assembly (3) and the output axle (4) achieve secondary stage mesh transmission by means of the intermediate rotary body (32) which is provided on the worm wheel assembly (3) and a rotary disc assembly (5) which is mounted on the output axle (4).

5. The transmission device according to claim 4, wherein the intermediate rotary body (32) is provided with grooves for cooperation with the second worm wheel teeth (52) of the rotary disc assembly (5) on the outside in the circumferential direction, wherein the second worm wheel teeth (52) are shaped as rotating balls.

6. The transmission device according to claim 1, wherein the worm assembly (1) comprises a lower casing (12) and an upper casing (14), the lower casing (12) and the upper casing (14) are both approximately hemispherical and are assembled together to form an approximately spherical cavity (16) for accommodating the worm wheel assembly (3) therein, and the inner sides of the lower casing (12) and the upper casing (14) are provided with helical-teeth-shaped first worm teeth (15) for meshing with the worm wheel assembly (3).

7. The transmission device according to claim 6, wherein the upper portion of the spherical cavity (16) is open, and the lower portion of the spherical cavity (16) is closed by a worm base (17) which has a disc shape; the input axle (11) is disposed below the worm base (17).

8. The transmission device according to claim 7, wherein the axes of the lower casing (12), upper casing (14), spherical cavity (16), worm base (17) and input axle (11) coincide with each other.

9. The transmission device according to claim 1, wherein the first worm wheel teeth (34) shaped as rotating balls are meshed from the inside of the worm assembly by the first worm teeth (15) of the worm assembly (1), the teeth surface of the first worm teeth (15) is enveloped by a sphere, so as to convert the sliding friction between the worm wheel assembly and the worm assembly into rolling friction.

* * * * *